US009807026B2

(12) United States Patent
Cao (10) Patent No.: US 9,807,026 B2
(45) Date of Patent: Oct. 31, 2017

(54) HIERARCHICAL QUALITY OF SERVICE SCHEDULING METHOD AND DEVICE (71) Applicant: ZTE Corporation, Shenzhen (CN)

(72) Inventor: Dengyuan Cao, Shenzhen (CN)

(73) Assignee: XI'AN ZHONGXING NEW SOFTWARE CO. LTD, Xi'an (CN)

(*) Notice: Subject to any disclaimer, the term of this patent is extended or adjusted under 35 U.S.C. 154(b) by 82 days.

(21) Appl. No.: 14/763,695

(22) PCT Filed: Jan. 2, 2014

(86) PCT No.: PCT/CN2014/070042
§ 371 (c)(1),
(2) Date: Jul. 27, 2015

(87) PCT Pub. No.: WO2014/114188
PCT Pub. Date: Jul. 31, 2014

(65) Prior Publication Data
US 2015/0334036 A1 Nov. 19, 2015

(30) Foreign Application Priority Data

Jan. 28, 2013 (CN) .......................... 2013 1 0031861

(51) Int. Cl.
H04L 12/28 (2006.01)
H04L 12/56 (2006.01)
(Continued)

(52) U.S. Cl.
CPC .............. H04L 47/60 (2013.01); H04L 12/56 (2013.01); H04L 47/6265 (2013.01);
(Continued)

(58) Field of Classification Search
None
See application file for complete search history.

(56) References Cited

U.S. PATENT DOCUMENTS

2004/0010572 A1* 1/2004 Watanabe ........... H04L 63/0263
709/220
2004/0179542 A1* 9/2004 Murakami .............. H04L 45/00
370/413
(Continued)

FOREIGN PATENT DOCUMENTS

CN 101035139 A 9/2007
CN 101060434 A 10/2007
(Continued)

OTHER PUBLICATIONS

International Search Report for corresponding application PCT/CN2014/070042 filed Jan. 2, 2014; Mail date Apr. 3, 2014.

Primary Examiner — Edan Orgad
Assistant Examiner — Rebecca Song
(74) Attorney, Agent, or Firm — Cantor Colburn LLP (57) ABSTRACT Provided are an HQoS scheduling method and device. A received uplink data packet is encapsulated and stored in a queue in uplink direction, and an uplink queue scheduling component is requested to perform scheduling. In this manner, HQoS scheduling in the uplink direction is implemented, and a personalized demand of a user can be met by scheduling uplink data, to carry out more flexible function customization. According to the method and device, the data packet may be further sent to a downlink direction after the HQoS scheduling in the uplink direction is completed, and the HQoS scheduling can be performed on the data in the downlink direction, so that the HQoS scheduling is respectively performed on the data in both the uplink direction and the downlink direction; in this manner, the real bidirectional HQoS scheduling control is implemented, and QoS of the user service can be guaranteed in both directions.

18 Claims, 3 Drawing Sheets (51) Int. Cl.
*H04L 12/869* (2013.01)
*H04L 12/865* (2013.01)
*H04L 12/935* (2013.01)
*H04L 12/863* (2013.01)
*H04L 12/54* (2013.01)
*H04W 72/12* (2009.01)

(52) U.S. Cl.
CPC ...... *H04L 47/6275* (2013.01); *H04L 49/3027* (2013.01); *H04W 72/1236* (2013.01)

(56) References Cited

U.S. PATENT DOCUMENTS

2005/0249220 A1* 11/2005 Olsen .................. H04L 12/5693
370/395.4
2010/0309792 A1* 12/2010 Wang .................. H04L 47/6215
370/246

FOREIGN PATENT DOCUMENTS

| | | |
|---|---|---|
| CN | 101110745 A | 1/2008 |
| CN | 101478475 A | 7/2009 |
| CN | 102149206 A | 8/2011 |
| CN | 103152289 A | 6/2013 |

* cited by examiner

HIERARCHICAL QUALITY OF SERVICE SCHEDULING METHOD AND DEVICE

TECHNICAL FIELD

The present disclosure relates to the technical field of communications, and in particular to a Hierarchical Quality of Service (HQoS) scheduling method and device.

BACKGROUND

Figure 1:
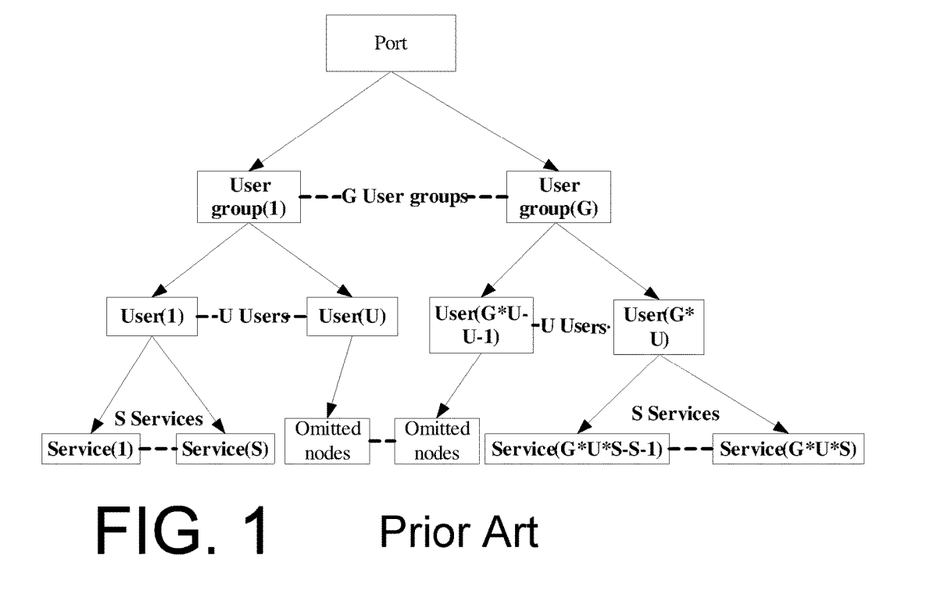
FIG. 1 is a diagram of each hierarchy of the HQoS.

In the field of communications, the HQoS is for use in guaranteeing the Quality of Service (QoS) of multiple users and multiple services. Referring to FIG. 1, under a specific port, e.g., a physical port or a virtual port, three hierarchies, namely user group, user and service, can be divided, and QoS characteristic parameters can be configured on nodes of each hierarchy, thereby guaranteeing the HQoS of multiple users and multiple services.

Figure 2:
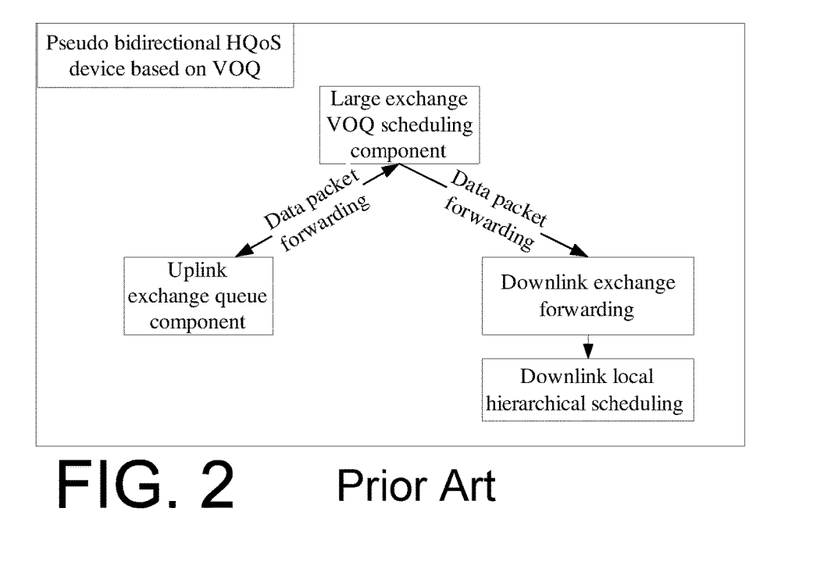
FIG. 2 is a diagram of a pseudo bidirectional HQoS device based on Virtual Output Queue (VOQ)

In the related art, the HQoS scheduling can only be implemented in a downlink direction basically, but cannot be implemented in an uplink direction. FIG. 2 is a method for implementing a pseudo bidirectional HQoS scheduling. In the method, an uplink small exchange sends a data forwarding request to a large exchange through a data stream; the large exchange responds to the scheduling and request according to the priority of a Virtual Output Queue (VOQ); the uplink small exchange acquires a forwarding authorization, and sends a data packet to a downlink exchange; at last, the data packet is sent to an egress at a downlink exchange chip through local HQoS scheduling. Such system design is disadvantaged in: firstly, a scheduling function of the VOQ at the large exchange is limited, e.g., the scheduling is carried out according to the priority only, and the hierarchical scheduling cannot be implemented; secondly, the number of queues of the VOQ at the large exchange is limited, e.g., only the most basic forwarding queue resources can be guaranteed, and VOQ scheduling cannot be implemented based on multiple services of user. Thus, how to implement the HQoS scheduling in the uplink direction and meet a personalized demand of a user to carry out flexible function customization are the major problems to be solved.

SUMMARY

The present disclosure provides an HQoS scheduling method and device, which solve the problem that the HQoS scheduling cannot be performed in an uplink direction.

For solving the above technical problem, the technical solutions of the embodiments of the present disclosure are implemented as follows.

An HQoS scheduling method is provided, which includes:

a received uplink data packet is parsed, and a message of the data packet is encapsulated, wherein the encapsulated message of the data packet contains: information of a queue in an uplink direction; and the data packet is stored in the queue in the uplink direction according to the information of the queue in the uplink direction, and an uplink scheduling request is sent to an uplink queue scheduling component; when the uplink queue scheduling component responds with uplink authorization information, the data packet is sent.

In an example embodiment, the encapsulated message of the data packet further contains: information of a queue in a downlink direction; after the uplink queue scheduling component responds with the uplink authorization information, sending the data packet includes:

the message of the data packet is sent to a downlink direction through a data exchange channel;

the message of the data packet forwarded by the data exchange channel is received;

the data packet is stored in the queue in the downlink direction according to the information of the queue in the downlink direction contained in the message, and a downlink scheduling request is sent to a downlink queue scheduling component; and when the downlink queue scheduling component responds with downlink authorization information, the data packet is sent.

In an example embodiment, when the uplink queue scheduling component does not respond with any information or responds with the uplink un-authorization information, the data packet is discarded.

In an example embodiment, the encapsulated message of the data packet further contains: information of a queue in a downlink direction; after the uplink queue scheduling component responds with the uplink authorization information, sending the data packet includes:

the message of the data packet is sent to a downlink direction through a data exchange channel;

the message of the data packet forwarded by the data exchange channel is received;

the data packet is stored in the queue in the downlink direction according to the information of the queue in the downlink direction contained in the message, and a downlink scheduling request is sent to a downlink queue scheduling component; and when the information of the queue in the downlink direction responds with downlink authorization information, the data packet is sent.

In an example embodiment, before receiving the message of the data packet forwarded by the data exchange channel, the method further includes:

a downlink configuration scheduling parameter and a downlink bandwidth attribute are set on an egress in the downlink queue scheduling component;

after the downlink queue scheduling component receives the downlink scheduling request, the method further includes:

it is determined whether to send the downlink authorization information according to the set downlink configuration scheduling parameter and downlink bandwidth attribute; when a configured parameter condition is met, the downlink authorization information is sent; when the configured parameter condition is not met, no information is sent or downlink un-authorization information is sent.

In an example embodiment, when the downlink queue scheduling component does not respond with any information or responds with the downlink un-authorization information, the data packet is discarded.

An HQoS scheduling device is also provided, which includes: a receiving component, an uplink data exchange component, an uplink queue scheduling component and a sending component, wherein the receiving component is configured to receive a transmitted uplink data packet, parse the data packet, and send the data packet to the uplink data exchange component after encapsulating a message of the data packet, wherein the encapsulated message of the data packet contains: information of a queue in an uplink direction;

the uplink data exchange component is configured to store the data packet in the queue in the uplink direction according to the information of the queue in the uplink direction, send an uplink scheduling request to the uplink queue scheduling component, and when the uplink queue scheduling component responds with uplink authorization information, send the data packet through a data exchange channel;

the uplink queue scheduling component is configured to respond with corresponding information to the uplink data exchange component according to the uplink scheduling request sent by the uplink data exchange component; and the sending component is configured to send the data packet.

In an example embodiment, the uplink queue scheduling component is further configured to set a virtual port, an uplink configuration scheduling parameter and an uplink bandwidth attribute, determine whether to send the uplink authorization information according to the set uplink configuration scheduling parameter and uplink bandwidth attribute, and when a configured parameter condition is met, send the uplink authorization information, when the configured parameter condition is not met, not send any information or send the uplink un-authorization information.

In an example embodiment, the uplink data exchange component is further configured to, when the uplink queue scheduling component does not respond with any information or responds with the uplink un-authorization information, discard the data packet.

In an example embodiment, the HQoS scheduling device further includes a downlink data exchange component and a downlink queue scheduling component; the message of the data packet encapsulated by the receiving component further contains: information of a queue in a downlink direction;

the uplink data exchange component is further configured to, after receiving the uplink authorization information, send the message of the data packet to the downlink data exchange component through a data exchange channel;

the downlink data exchange component is configured to store the data packet in the queue in the downlink direction according to the information of the queue in the downlink direction contained in the message of the data packet, and send a downlink scheduling request to the downlink queue scheduling component; and the downlink queue scheduling component is configured to respond with corresponding information to the downlink data exchange component according to the downlink scheduling request sent by the downlink data exchange component.

In an example embodiment, the downlink queue scheduling component is further configured to, before the downlink data exchange component receives the message of the data packet forwarded by the data exchange channel, set a downlink configuration scheduling parameter and a downlink bandwidth attribute on the egress in the downlink queue scheduling component, and after receiving the downlink scheduling request, determine whether to send downlink authorization information according to the set downlink configuration scheduling parameter and downlink bandwidth attribute, when a configured parameter condition is met, send the downlink authorization information; when the configured parameter condition is not met, not send any information or send downlink un-authorization information.

In an example embodiment, the downlink data exchange component is further configured to, when the downlink queue scheduling component does not respond with any information or responds with the downlink un-authorization information, discard the data packet.

The embodiments of the present disclosure have the following beneficial effects: by encapsulating the received uplink data packet and storing the data packet in the queue in the uplink direction, and requesting the uplink queue scheduling component to perform scheduling, the HQoS scheduling in the uplink direction is implemented, and a personalized demand of a user can be met by scheduling uplink data, so as to carry out more flexible function customization.

In an example embodiment, this technical solution specifically uses the technology of internal virtual port, for example, a virtual port is set in the uplink queue scheduling component to serve as a configuration carrier of the HQoS scheduling in the uplink direction, so that the uplink queue scheduling component can perform parameter setting of the uplink configuration scheduling parameter and the uplink bandwidth attribute more comprehensively and fast.

Meanwhile, in this technical solution, the data packet may be further sent to the downlink direction after the HQoS scheduling in the uplink direction is completed, and the HQoS scheduling can be performed on the data in the downlink direction, so that the HQoS scheduling is respectively performed on the data in both the uplink direction and the downlink direction; in this manner, the real bidirectional HQoS scheduling control is implemented, and the QoS of the user service can be guaranteed in both directions.

DETAILED DESCRIPTION OF THE EMBODIMENTS

The general conception of the embodiments of the present disclosure is that: by encapsulating the uplink data packet and storing the data packet in the queue in the uplink direction, and performing the HQoS scheduling, the HQoS scheduling of the data packet in the uplink direction is implemented. Specifically, some embodiments of the present disclosure set a virtual port in the uplink queue scheduling component, so that the virtual port serves as the configuration carrier of the HQoS scheduling in the uplink direction, thereby realizing the parameter setting of the uplink configuration scheduling parameter and the uplink bandwidth attribute. In addition, in some embodiments of the disclosure, for guaranteeing the QoS of the user service to the greatest extent, the HQoS scheduling may also be performed in the downlink direction besides the uplink direction, so that a bidirectional HQoS scheduling process is implemented, the QoS of the user is guaranteed to the greatest extent, and a personalized demand of the user is met. For making the technical solutions and the advantages of the embodiments of the present disclosure more clear, the present disclosure is elaborated below with reference to the embodiments and the accompanying drawings.

Figure 3:
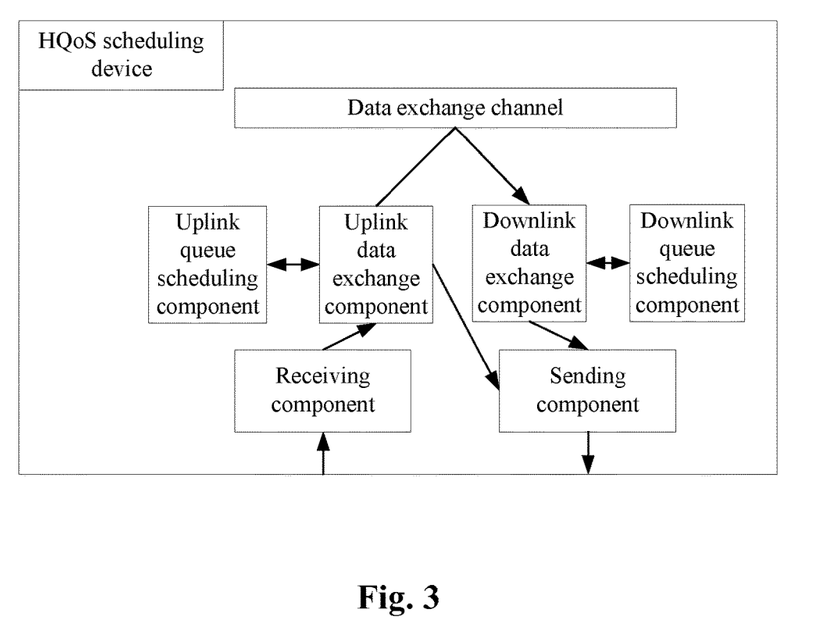
FIG. 3 is a structural diagram of an HQoS scheduling device in an embodiment of the present disclosure.

With reference to FIG. 3, an HQoS scheduling device is provided in an embodiment of the disclosure, which includes: a receiving component, an uplink data exchange component, an uplink queue scheduling component and a sending component; wherein, the receiving component is configured to receive a transmitted uplink data packet, parse the data packet, and send the data packet to the uplink data exchange component after encapsulating a message of the data packet, wherein the encapsulated message of the data packet contains: information of a queue in an uplink direction;

the uplink data exchange component is configured to store the data packet in the queue in the uplink direction according to the information of the queue in the uplink direction, send an uplink scheduling request to the uplink queue scheduling component, and when the uplink queue scheduling component responds with uplink authorization information, send the data packet through a data exchange channel;

the uplink queue scheduling component is configured to respond with corresponding information to the uplink data exchange component according to the uplink scheduling request sent by the uplink data exchange component; and the sending component is configured to send the data packet.

In addition, the HQoS scheduling device in the embodiment of the disclosure may also perform the HQoS scheduling on data in the downlink direction besides data in the uplink direction. Specifically, the HQoS scheduling device may further include: a downlink data exchange component and a downlink queue scheduling component; wherein, the downlink data exchange component is configured to store the data packet in a queue in a downlink direction according to information of the queue in the downlink direction contained in the message of the data packet which is forwarded by the uplink data exchange component, and send a downlink scheduling request to the downlink queue scheduling component; and the downlink queue scheduling component is configured to respond with corresponding information to the downlink data exchange component according to the downlink scheduling request sent by the downlink data exchange component.

Not just for elaborating the function of each component in the HQoS scheduling device better, but for facilitating elaboration of the HQoS scheduling method in the embodiment of the disclosure, the HQoS scheduling method is further elaborated below in combination with the function of each component in the HQoS scheduling device.

Figure 4:
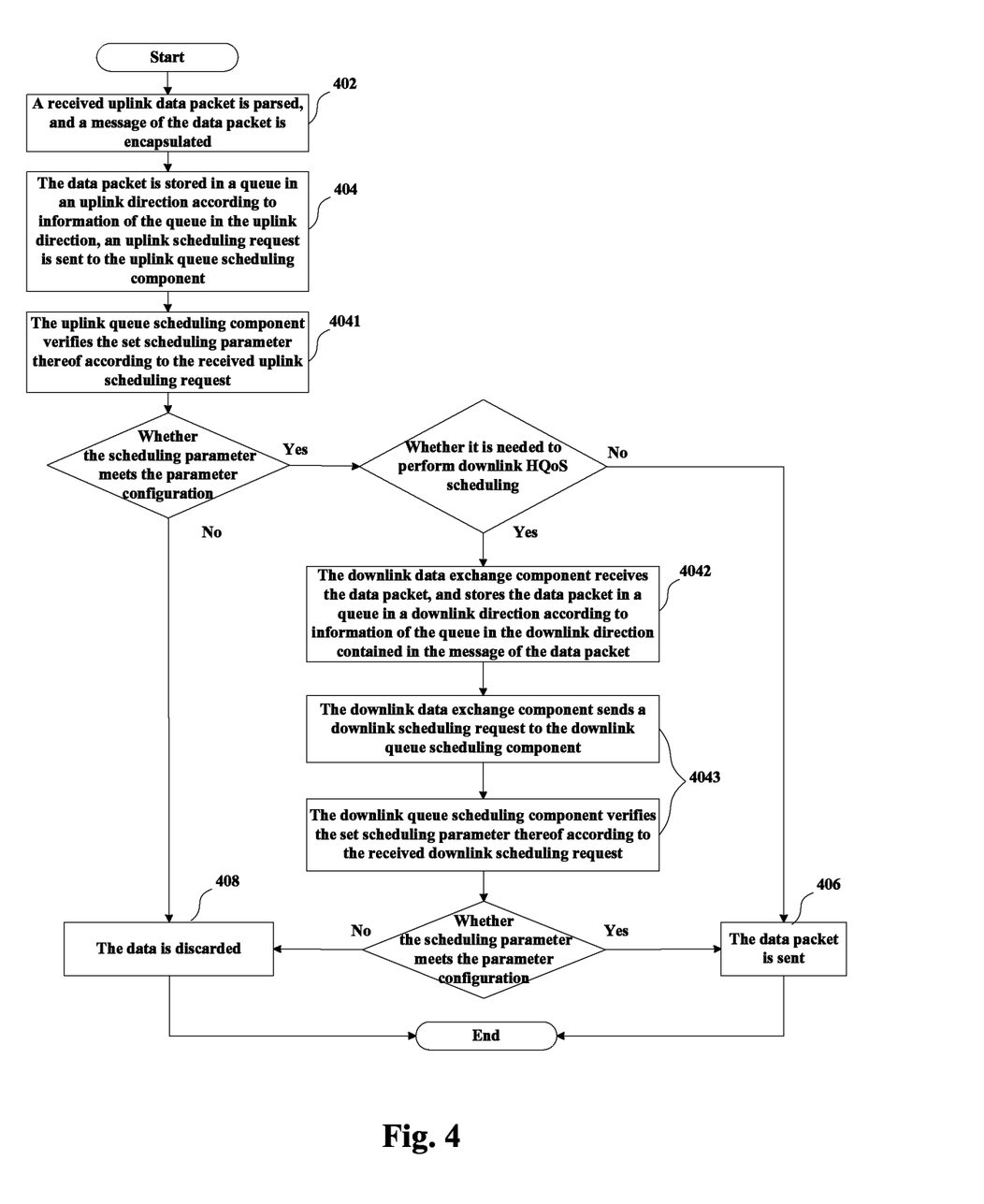
FIG. 4 is a flowchart of an HQoS scheduling method in an embodiment of the present disclosure.

With reference to FIG. 4, the HQoS scheduling method in an example embodiment of the disclosure mainly includes the following steps.

Step 402: A received uplink data packet is parsed, and a message of the data packet is encapsulated; then Step 404 is executed.

In this step, a receiving component receives the uplink data packet from a physical port, parses the data packet, and encapsulates the message of the data packet, wherein the encapsulated message of the data packet contains: information of a queue in an uplink direction. In addition, if it is also needed to perform the HQoS scheduling on the downlink data after the HQoS scheduling on the uplink data is completed, when the receiving component encapsulates the message of the data packet, the encapsulated message of the data packet may also contain information of a queue in a downlink direction.

Before this step, for making setting of the scheduling configuration parameter more convenient and comprehensive, the method may also include the following step:

a virtual port is set in the uplink queue scheduling component to serve as a configuration carrier of the HQoS scheduling in the uplink direction, and an uplink configuration scheduling parameter and an uplink bandwidth attribute are set on the virtual port. Of course, the uplink configuration scheduling parameter and the uplink bandwidth attribute set at this point may also be not set on the virtual port, but preset in the device; the setting mode of the virtual port in the present embodiment is not the only setting mode.

Similarly, in the present embodiment, if it is also needed to perform the HQoS scheduling in the downlink direction, in an example embodiment, a downlink configuration scheduling parameter and a downlink bandwidth attribute may be set on an egress in the downlink queue scheduling component.

Step 404: The data packet is stored in the queue in the uplink direction according to the information of the queue in the uplink direction, and an uplink scheduling request is sent to the uplink queue scheduling component; if the request is passed, Step 406 is executed; if the request is failed, Step 408 is executed.

In this step, the uplink data exchange component receives the message of the data packet forwarded by the receiving component, stores the data packet in the queue in the uplink direction according to the information of the queue in the uplink direction, and sends the uplink scheduling request to the uplink queue scheduling component. In the present embodiment, the step of processing the uplink scheduling request by the uplink queue scheduling component may include the following sub-steps 4041 to 4043 specifically.

Step 4041: the uplink queue scheduling component verifies the set scheduling parameter thereof according to the received uplink scheduling request; if the scheduling parameter meets the parameter configuration, then the uplink queue scheduling component sends an uplink authorization message to the uplink data exchange component; if the encapsulated message of the data packet contains the information of the queue in the downlink direction, then Step 4042 is executed; if the encapsulated message of the data packet does not contain the information of the queue in the downlink direction, then Step 406 is executed; in addition, if the scheduling parameter does not meet the parameter configuration, then the uplink queue scheduling component sends an uplink un-authorization message to the uplink data exchange component or does not send any message, and then Step 408 is executed. In an example embodiment, in this step, a preferable mode of setting the configuration parameter is that: the uplink queue scheduling component may preset a virtual port which serves as the configuration carrier of the HQoS scheduling in the uplink direction, and may set the uplink configuration scheduling parameter and the uplink bandwidth attribute on the virtual port.

Step 4042: the downlink data exchange component receives the data packet forwarded by the uplink data exchange component through a data exchange channel, and stores the data packet in the queue in the downlink direction according to the information of the queue in the downlink direction contained in the message of the data packet; then Step 4043 is executed.

Step 4043: the downlink data exchange component sends a downlink scheduling request to the downlink queue scheduling component; if the request is passed, Step 406 is executed; if the request is failed, Step 408 is executed.

In this step, the downlink queue scheduling component verifies the set scheduling parameter thereof according to the received downlink scheduling request; if the scheduling parameter meets the parameter configuration, then the downlink queue scheduling component sends a downlink authorization message to the downlink data exchange component, and then Step 406 is executed; if the scheduling parameter does not meet the parameter configuration, then the downlink queue scheduling component sends a downlink un-authorization message to the downlink data exchange component or does not send any message, and then Step 408 is executed. In an example embodiment, in this step, a preferable mode of setting the configuration parameter is that: the downlink queue scheduling component may set the downlink configuration scheduling parameter and the downlink bandwidth attribute on its egress.

Step 406: The data is sent.

In this step, the sending component receives authorized sending information, and then sends the corresponding data.

Step 408: The data is discarded.

in this step, when the uplink data exchange component receives the uplink un-authorization information sent by the uplink queue scheduling component or does not receive any information in preset time period, the uplink data exchange component discards the data packet according to a discarding technology. Similarly, when the downlink data exchange component receives the downlink un-authorization information sent by the downlink queue scheduling component or does not receive any information in preset time period, the downlink data exchange component also discards the data packet according to a discarding technology.

In the present embodiment, it is allowed to only perform the HQoS scheduling in the uplink direction, and a more comprehensive scheduling mode may also be implemented, namely using the modes in Step 4042 and Step 4043 to perform the HQoS scheduling in the downlink direction, so that the bidirectional HQoS scheduling is truly implemented.

In an example embodiment, the receiving component and the sending component may be one receiving-sending component integrated on one chip, and the uplink data exchange component and the downlink data exchange component may also be one data exchange component integrated on one chip. There can be various specific setting modes, which will not be enumerated here.

The above content is a further elaboration of the present disclosure made in combination with the specific embodiments, and it should not be considered that the specific implementations of the present disclosure are only limited to the elaboration. On the premise of not departing from the conception of the present disclosure, the common skilled in the technical field to which the present disclosure belongs can also make a number of simple deductions and replacements, which shall fall within the scope of the claims of the present disclosure.

INDUSTRIAL APPLICABILITY

The technical solutions provided by the present disclosure can be applied to the field of communications. The data packet may be further sent to the downlink direction after the HQoS scheduling in the uplink direction is completed, and the HQoS scheduling can be performed on the data in the downlink direction, so that the HQoS scheduling is respectively performed on the data in both the uplink direction and the downlink direction. In this manner, the real bidirectional HQoS scheduling control is implemented, and the QoS of the user service can be guaranteed in both directions.

What is claimed is:

1. A Hierarchical Quality of Service (HQoS) scheduling method, comprising:

parsing a received uplink data packet, and encapsulating a message of the data packet, wherein the encapsulated message of the data packet contains: information of a queue in an uplink direction; and storing the data packet in the queue in the uplink direction according to the information of the queue in the uplink direction, sending an uplink scheduling request to an uplink queue scheduling component, and sending the data packet when the uplink queue scheduling component responds with uplink authorization information;

wherein before the uplink data packet is received, the method further comprises:

setting a virtual port in the uplink queue scheduling component, and setting an uplink configuration scheduling parameter and an uplink bandwidth attribute;

after the uplink queue scheduling component receives the uplink scheduling request, the method further comprises:

determining whether to send the uplink authorization information according to the set uplink configuration scheduling parameter and uplink bandwidth attribute; when a configured parameter condition is met, sending the uplink authorization information; when the configured parameter condition is not met, not sending any information or sending uplink un-authorization information.

2. The HQoS scheduling method according to claim 1, wherein when the uplink queue scheduling component does not respond with any information or responds with the uplink un-authorization information, the data packet is discarded.

3. The HQoS scheduling method according to claim 2, wherein the encapsulated message of the data packet further contains: information of a queue in a downlink direction; after the uplink queue scheduling component responds with the uplink authorization information, sending the data packet comprises:

sending the message of the data packet to a downlink direction through a data exchange channel;

receiving the message of the data packet forwarded by the data exchange channel;

storing the data packet in the queue in the downlink direction according to the information of the queue in the downlink direction contained in the message, and sending a downlink scheduling request to a downlink queue scheduling component; and when the downlink queue scheduling component responds with downlink authorization information, sending the data packet.

4. The HQoS scheduling method according to claim 1, wherein the encapsulated message of the data packet further contains: information of a queue in a downlink direction; after the uplink queue scheduling component responds with the uplink authorization information, sending the data packet comprises:

sending the message of the data packet to a downlink direction through a data exchange channel;

receiving the message of the data packet forwarded by the data exchange channel;

storing the data packet in the queue in the downlink direction according to the information of the queue in the downlink direction contained in the message, and sending a downlink scheduling request to a downlink queue scheduling component; and when the downlink queue scheduling component responds with downlink authorization information, sending the data packet.

5. The HQoS scheduling method according to 4, wherein before the message of the data packet forwarded by the data exchange channel is received, the method further comprises:

setting a downlink configuration scheduling parameter and a downlink bandwidth attribute on an egress in the downlink queue scheduling component;

after the downlink queue scheduling component receives the downlink scheduling request, the method further comprises:
determining whether to send the downlink authorization information according to the set downlink configuration scheduling parameter and downlink bandwidth attribute; when a configured parameter condition is met, sending the downlink authorization information; when the configured parameter condition is not met, not sending any information or sending downlink un-authorization information.

6. The HQoS scheduling method according to 5, wherein when the downlink queue scheduling component does not respond with any information or responds with the downlink un-authorization information, the data packet is discarded.

7. The HQoS scheduling method according to claim 1, wherein the encapsulated message of the data packet further contains: information of a queue in a downlink direction; after the uplink queue scheduling component responds with the uplink authorization information, sending the data packet comprises:
sending the message of the data packet to a downlink direction through a data exchange channel;
receiving the message of the data packet forwarded by the data exchange channel;
storing the data packet in the queue in the downlink direction according to the information of the queue in the downlink direction contained in the message, and sending a downlink scheduling request to a downlink queue scheduling component; and
when the downlink queue scheduling component responds with downlink authorization information, sending the data packet.

8. The HQoS scheduling method according to 7, wherein before the message of the data packet forwarded by the data exchange channel is received, the method further comprises:
setting a downlink configuration scheduling parameter and a downlink bandwidth attribute on an egress in the downlink queue scheduling component;
after the downlink queue scheduling component receives the downlink scheduling request, the method further comprises:
determining whether to send the downlink authorization information according to the set downlink configuration scheduling parameter and downlink bandwidth attribute; when a configured parameter condition is met, sending the downlink authorization information; when the configured parameter condition is not met, not sending any information or sending downlink un-authorization information.

9. The HQoS scheduling method according to 8, wherein when the downlink queue scheduling component does not respond with any information or responds with the downlink un-authorization information, the data packet is discarded.

10. A Hierarchical Quality of Service (HQoS) scheduling device, comprising: a receiving component, an uplink data exchange component, an uplink queue scheduling component and a sending component, wherein
the receiving component is configured to receive a transmitted uplink data packet, parse the data packet, and send the data packet to the uplink data exchange component after encapsulating a message of the data packet, wherein the encapsulated message of the data packet contains: information of a queue in an uplink direction;
the uplink data exchange component is configured to store the data packet in the queue in the uplink direction according to the information of the queue in the uplink direction, send an uplink scheduling request to the uplink queue scheduling component, and when the uplink queue scheduling component responds with uplink authorization information, send the data packet through a data exchange channel;
the uplink queue scheduling component is configured to respond with corresponding information to the uplink data exchange component according to the uplink scheduling request sent by the uplink data exchange component; and
the sending component is configured to send the data packet;
wherein the uplink queue scheduling component is further configured to set a virtual port, an uplink configuration scheduling parameter and an uplink bandwidth attribute, determine whether to send the uplink authorization information according to the set uplink configuration scheduling parameter and uplink bandwidth attribute, and when a configured parameter condition is met, send the uplink authorization information, when the configured parameter condition is not met, not send any information or send uplink un-authorization information.

11. The HQoS scheduling device according to claim 10, wherein the uplink data exchange component is further configured to, when the uplink queue scheduling component does not respond with any information or responds with the uplink un-authorization information, discard the data packet.

12. The HQoS scheduling device according to claim 11, further comprising: a downlink data exchange component and a downlink queue scheduling component; the message of the data packet encapsulated by the receiving component further contains: information of a queue in a downlink direction;
the uplink data exchange component is further configured to, after receiving the uplink authorization information, send the message of the data packet to the downlink data exchange component through the data exchange channel;
the downlink data exchange component is configured to store the data packet in the queue in the downlink direction according to the information of the queue in the downlink direction contained in the message of the data packet, and send a downlink scheduling request to the downlink queue scheduling component; and
the downlink queue scheduling component is configured to respond with corresponding information to the downlink data exchange component according to the downlink scheduling request sent by the downlink data exchange component.

13. The HQoS scheduling device according to claim 10, further comprising: a downlink data exchange component and a downlink queue scheduling component; the message of the data packet encapsulated by the receiving component further contains: information of a queue in a downlink direction;
the uplink data exchange component is further configured to, after receiving the uplink authorization information, send the message of the data packet to the downlink data exchange component through the data exchange channel;
the downlink data exchange component is configured to store the data packet in the queue in the downlink direction according to the information of the queue in the downlink direction contained in the message of the data packet, and send a downlink scheduling request to the downlink queue scheduling component; and the downlink queue scheduling component is configured to respond with corresponding information to the downlink data exchange component according to the downlink scheduling request sent by the downlink data exchange component.

14. The HQoS scheduling device according to claim 13, wherein the downlink queue scheduling component is further configured to, before the downlink data exchange component receives the message of the data packet forwarded by the data exchange channel, set a downlink configuration scheduling parameter and a downlink bandwidth attribute on an egress in the downlink queue scheduling component, and after receiving the downlink scheduling request, determine whether to send downlink authorization information according to the set downlink configuration scheduling parameter and downlink bandwidth attribute, when a configured parameter condition is met, send the downlink authorization information; when the configured parameter condition is not met, not send any information or send downlink un-authorization information.

15. The HQoS scheduling device according to claim 14, wherein the downlink data exchange component is further configured to, when the downlink queue scheduling component does not respond with any information or responds with the downlink un-authorization information, discard the data packet.

16. The HQoS scheduling device according to claim 10, further comprising: a downlink data exchange component and a downlink queue scheduling component; the message of the data packet encapsulated by the receiving component further contains: information of a queue in a downlink direction;

the uplink data exchange component is further configured to, after receiving the uplink authorization information, send the message of the data packet to the downlink data exchange component through the data exchange channel;

the downlink data exchange component is configured to store the data packet in the queue in the downlink direction according to the information of the queue in the downlink direction contained in the message of the data packet, and send a downlink scheduling request to the downlink queue scheduling component; and the downlink queue scheduling component is configured to respond with corresponding information to the downlink data exchange component according to the downlink scheduling request sent by the downlink data exchange component.

17. The HQoS scheduling device according to claim 16, wherein the downlink queue scheduling component is further configured to, before the downlink data exchange component receives the message of the data packet forwarded by the data exchange channel, set a downlink configuration scheduling parameter and a downlink bandwidth attribute on an egress in the downlink queue scheduling component, and after receiving the downlink scheduling request, determine whether to send downlink authorization information according to the set downlink configuration scheduling parameter and downlink bandwidth attribute, when a configured parameter condition is met, send the downlink authorization information; when the configured parameter condition is not met, not send any information or send downlink un-authorization information.

18. The HQoS scheduling device according to claim 17, wherein the downlink data exchange component is further configured to, when the downlink queue scheduling component does not respond with any information or responds with the downlink un-authorization information, discard the data packet.

* * * * *